United States Patent
Touhey et al.

(10) Patent No.: US 6,450,906 B1
(45) Date of Patent: Sep. 17, 2002

(54) SELF CONTAINED SPORT BALL INFLATION MECHANISM

(75) Inventors: Daniel P. Touhey, Lee, MA (US); Brian Feeney, East Windsor, CT (US); Joseph E. Stahl, Southampton, MA (US); Neil T. Amundsen, Minneapolis; Louis F. Polk, III, Excelsior, both of MN (US); Joseph J. Schachtner, Deer Park, WI (US); Kenneth V. Schomburg, Wayzata, MN (US); George D. Stickler, Shorewood, MN (US); Richard F. Terrazzano, Salem, NH (US); Eric K. Litscher, Hopkinton, MA (US); Andrew C. Harvey, Waltham, MA (US); Malcolm E. Taylor, Pepperell, MA (US); Peter M. de Bakker, Hudson, MA (US); Robert C. Sykes, Burlington, MA (US); Charles Keane, Hingham, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

(21) Appl. No.: 09/594,180

(22) Filed: Jun. 14, 2000

Related U.S. Application Data

(60) Provisional application No. 60/159,311, filed on Oct. 14, 1999.

(51) Int. Cl.$^7$ ................................................ A63B 41/12
(52) U.S. Cl. ....................................... 473/593; 473/604
(58) Field of Search ................................ 473/593, 594, 473/595, 603, 604, 605, 607, 608, 609, 610

(56) References Cited

U.S. PATENT DOCUMENTS

| | | | |
|---|---|---|---|
| 602,294 A | 4/1898 | Arnold | |
| 2,698,028 A | 12/1954 | Lee et al. | |
| 3,020,673 A | 2/1962 | Cooke | |
| 3,119,617 A | * 1/1964 | Topper | ........................ 473/593 |
| 5,098,095 A | 3/1992 | Weiss | |
| 5,238,244 A | 8/1993 | Cotter et al. | |

* cited by examiner

Primary Examiner—Steven Wong

(57) ABSTRACT

An inflatable sport ball, such as a basketball, a football, a soccer ball, a volley ball or a playground ball, is provided with a self-contained inflation mechanism for inflating or more likely adding pressure to the ball. The mechanism is a self-contained, manually operable pumping chamber which is inside of the ball and which is operable from outside of the ball to compress the chamber and pump ambient air into the ball.

9 Claims, 6 Drawing Sheets

SELF CONTAINED SPORT BALL INFLATION MECHANISM

This application claims the benefit of U.S. Provisional Application No. 60/159,311, filed Oct. 14, 1999.

BACKGROUND OF THE INVENTION

The present invention relates to sport balls which contain mechanisms for inflating or adding pressure to the balls.

Conventional inflatable sport balls, such as basketballs, footballs, soccer balls, volley balls and playground balls, are inflated through a traditional inflation valve using a separate inflation needle that is inserted into and through a self-sealing inflation valve. A separate pump, such as a traditional bicycle pump, is connected to the inflation needle and the ball is inflated using the pump. The inflation needle is then withdrawn from the inflation valve which self-seals to maintain the pressure. This system works fine until the sport ball needs inflation or a pressure increase and a needle and/or pump are not readily available.

SUMMARY OF THE INVENTION

The present invention provides a sport ball which has a self-contained inflation mechanism. The object is to be able to inflate or add pressure to a sport ball without the need for separate inflation equipment such as a separate inflation needle and pump. Specifically, the invention relates to a sport ball which has a self-contained, manually operable pumping chamber which pumps ambient air into the ball to achieve the desired pressure. More specifically, the pumping chamber includes means for admitting ambient air into the chamber and means for forcing that air from the chamber through one-way valve means into the interior volume of the ball.

DESCRIPTION OF THE PREFERRED EMBODIMENTS

Figure 1:
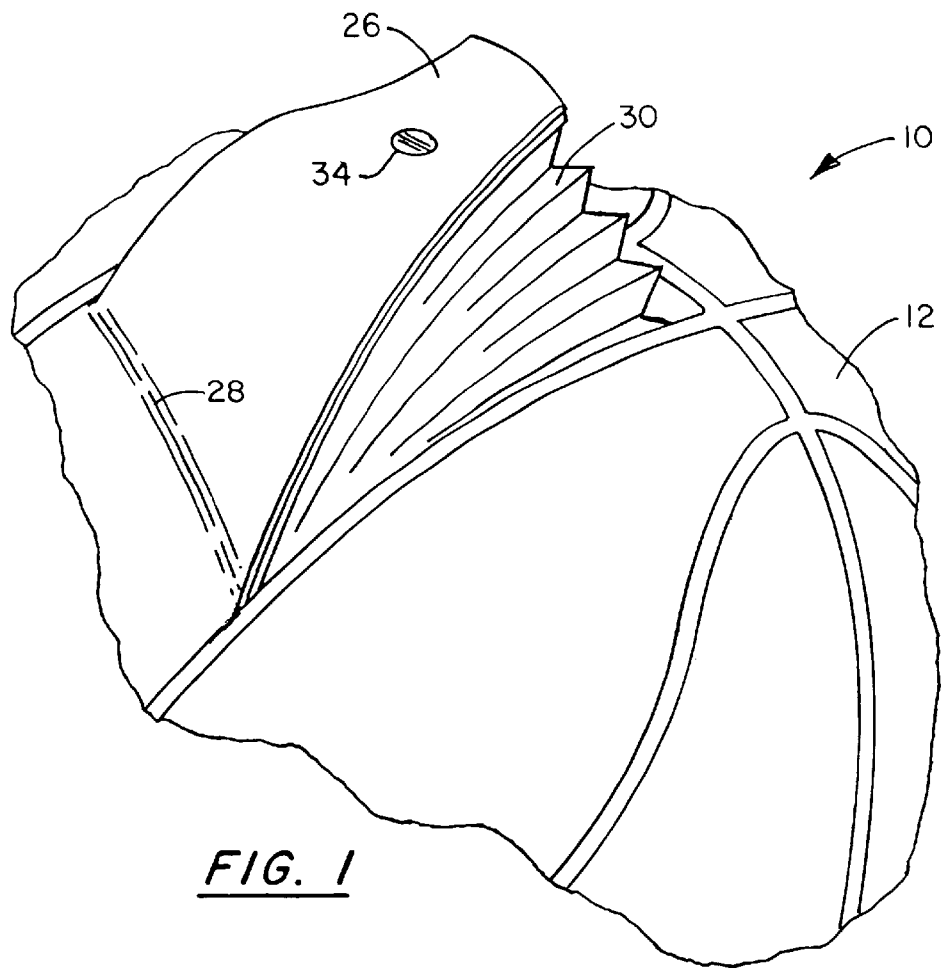
FIG. 1 shows a portion of a sport ball with a self-contained pumping chamber comprising a bellows arrangement operable from outside the ball for adding air pressure to the ball.
Figure 2:
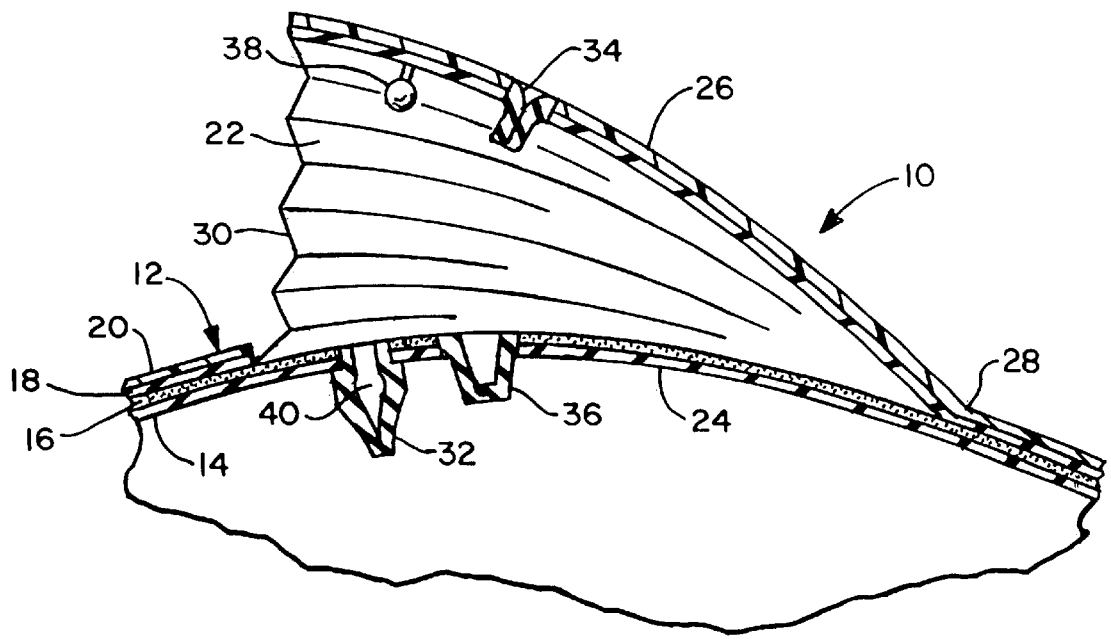
FIG. 2 is a cross-section view of the pumping chamber of FIG. 1.

Referring first to FIGS. 1 and 2 of the drawings, a portion of a sport ball 10 is illustrated incorporating one embodiment of an inflation pumping chamber of the invention. The ball which is illustrated is a typical basketball construction comprising a carcass 12 which is a term used herein to include all the various layers of the ball such as a rubber bladder 14 for air-retention, a layer 16 composed of layers of nylon or polyester yarn windings wrapped around the bladder and an outer rubber layer 18. For a laminated ball, the carcass also includes an additional outer layer 20 of leather or a synthetic comprising panels which are applied by adhesive and set by pressure during a cold molding process. The windings are randomly oriented and two or three layers thick and they form a layer which cannot be extended to any significant degree and which restricts the ball from expanding to any significant extent above its regulation size when inflated above its normal playing pressure. This layer for footballs, volleyballs and soccer balls is referred to as a lining layer and is usually composed of cotton or polyester cloth that is impregnated with a flexible binder resin such as vinyl or latex rubber.

In the present invention, a chamber of some sort is incorporated into the sport ball structure in which the chamber is filled with air and then the air is manually expelled from the chamber into the interior of the ball. The embodiment of the invention shown in FIGS. 1 and 2 has a section of the carcass 12 formed into a pump chamber 22 which includes an inner portion 24, which is a section of the bladder 14 and the layer 16, and an outer portion 26, which is a section of the rubber layer 18 and the outer layer 20. The outer portion 26 is attached along one edge 28 so that the outer portion 26 can be lifted and rotated around that attached edge 28 outwardly away from the carcass. The three free edges of the outer portion 26 are attached to the inner portion 24 by the bellows 30. The pump chamber 22 is thus bounded by the inner portion 24, the outer portion 26 and the bellows 30. Located in the inner portion 24 is a one-way valve 32 comprising a known duckbill valve which permits air flow from the pump chamber 22 into the sport ball when the bellows is closed but prevents reverse flow. Likewise, the outer portion 26 has a one-way valve 34 which also comprises a duckbill valve. This valve 34 permits air flow from the atmosphere into the pump chamber 22 when the bellows 30 is opened but does not permit reverse flow when the bellows is closed. The inner portion 24 has a recess 36 to accommodate the duckbill 34 when the bellows is closed. The outer portion 26 has a ball latch 38 which snaps into the recess 40 to hold the outer portion 26 down in the closed position. As shown in FIG. 2, this recess 40 is a part of the duckbill valve 32 but it could also be a separate recess. Velcro strips on the end of the outer portion 26 and on the corresponding surface of the inner portion 26 can also be used to hold the outer portion down. A small indentation and undercut may be formed on the end of the outer portion for access to pull the outer portion up.

Figure 3:
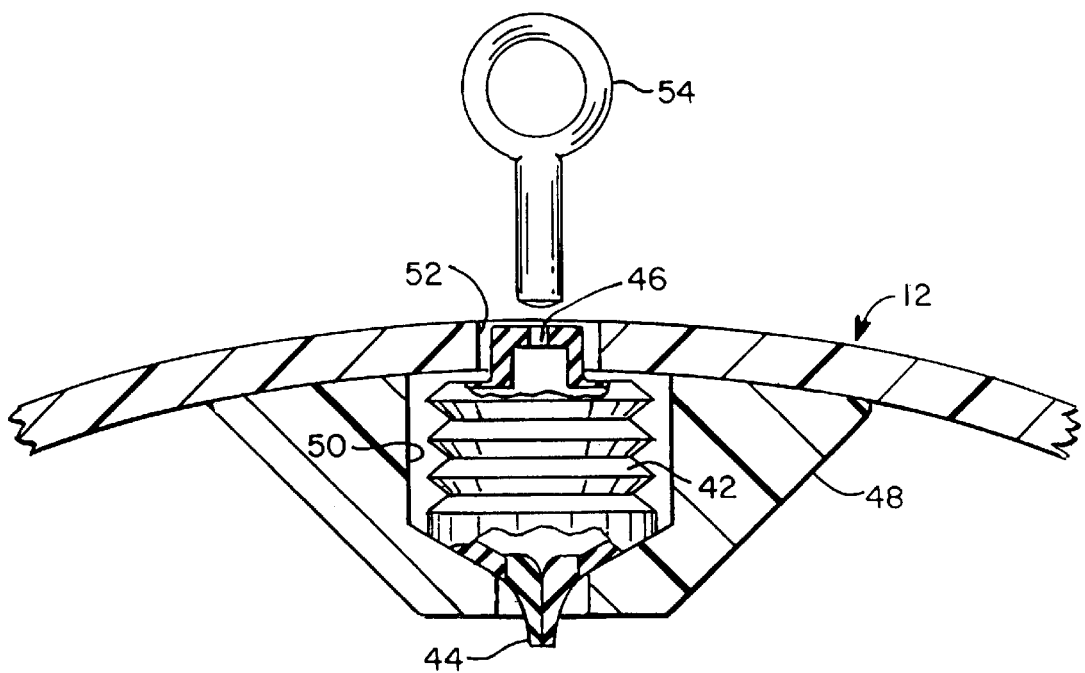
FIG. 3 is a view partially in cross section showing an alternative pumping chamber arrangement.

Another embodiment of the invention is shown in FIG. 3. This comprises a bulb 42 which has a bellows-shaped configuration such that the bulb can be compressed. This bulb 42 has a one-way valve, duckbill outlet 44 and a small inlet hole 46. The bulb 42 is mounted in a housing 48 with a recess 50 on the inside surface of the carcass 12. The carcass 12 has a small opening 52 for access to the compressible bulb 42 and for the passage of air. In order to make the opening 52 as small as possible and yet provide for the compression of the bulb, a small key 54 is provided which covers the inlet hole 46 in the bulb and is then used to compress the bulb to force the air out of the one-way outlet valve 44 into the sport ball.

Figure 4:
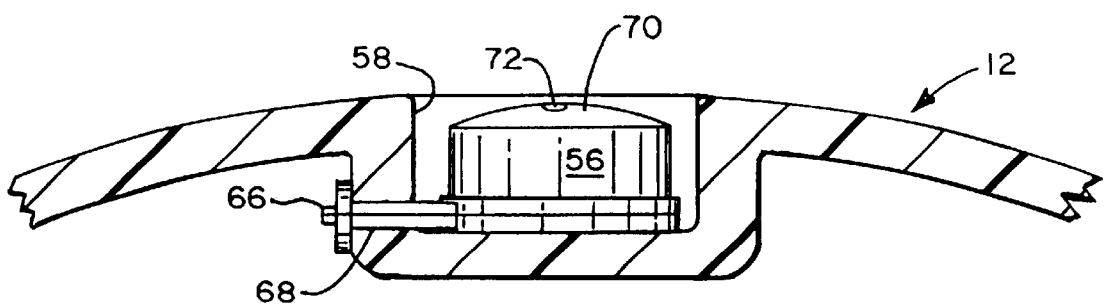
FIG. 4 is a view partially in cross section of another alternative pumping chamber arrangement.
Figure 5:
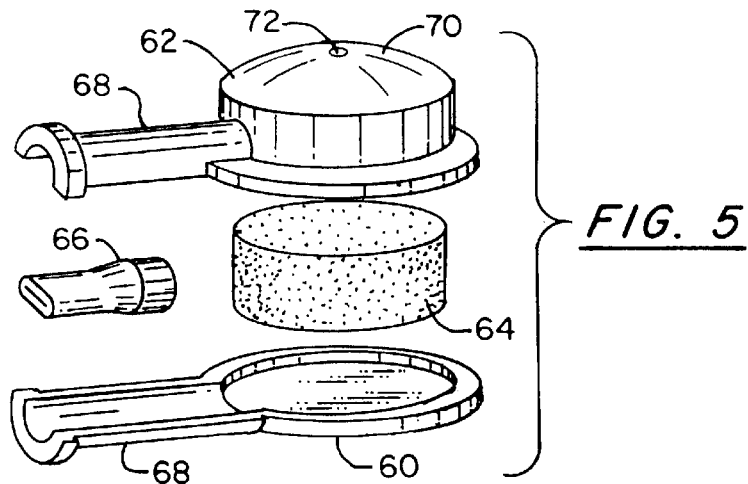
FIG. 5 is an isometric view of the separate components of the pumping chamber of FIG. 4.

FIGS. 4 and 5 illustrate a further embodiment of the invention comprising a compressible pump chamber 56 which is placed in a depression 58 in the sport ball carcass 12. The chamber 56 comprises the four parts illustrated in FIG. 5 including the base 60, the cover 62, the open cell foam pad 64 and the duckbill valve 66. The foam pad 64 and the duckbill 66 are placed into the base 60 and the cover 62 is cemented to the base 60 with the duckbill being located in the exit tube 68 that is formed. The top 70 of the cover 62 is flexible and has an air intake hole 72. The open cell foam pad 64 is normally full of air which has entered through the hole 72. The hole 72 is then covered with a finger and the flexible top 70 is pushed to compress the open cell foam pad 64 and force the air out through the exit tube 68 and duckbill 66. The cover 70 is then released and air enters the hole 72 to again fill the open cell foam pad 64.

Figure 6:
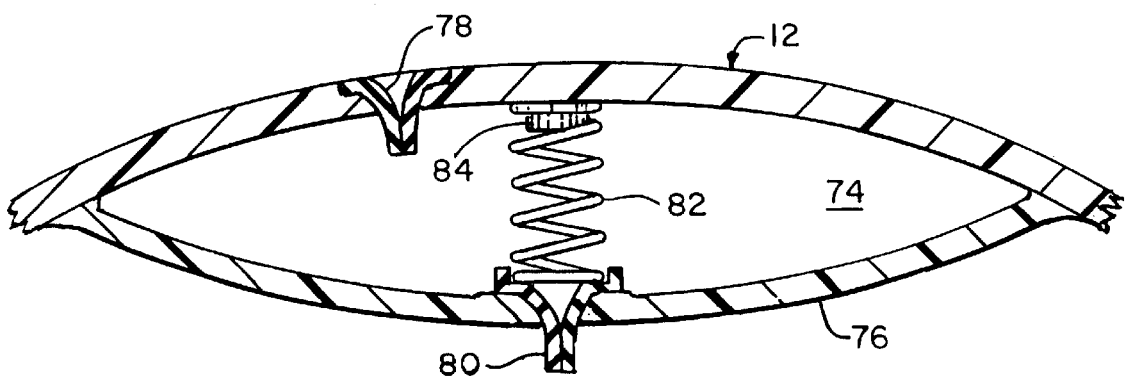
FIG. 6 is a cross-section view of a portion of a sport ball illustrating a further alternative pumping chamber.
Figure 7:
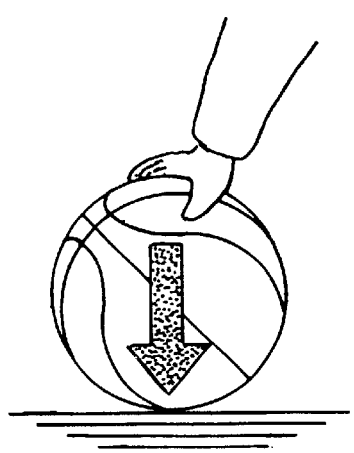
FIG. 7 is an illustration of a sport ball of the FIG. 6 type being pumped.

FIG. 6 illustrates another version of the invention wherein the pumping chamber 74 comprises the space between the carcass 12 and the relatively rigid partition 76 inside of the ball attached to the carcass. Duckbill one-way valves 78 and 80 are located in the carcass 12 and the partition 76 respectively. A spring 82 is located between the carcass 12 and the partition 76 and maintained in position by the duckbill 80 and a protrusion 84 on the inside of the carcass. The pressure in the ball is increased by pressing on the carcass 12 over the chamber 74 to compress the spring and expel the air from the chamber 74 through the duckbill 80 into the ball. When the pressure on the ball is released, the spring forces the carcass back out to its normal position which draws air from the atmosphere in through the duckbill 78 into the chamber 74. FIG. 7 illustrates pumping the ball by placing it on the ground or some other surface and pressing on the carcass in the region of the chamber.

Figure 8:
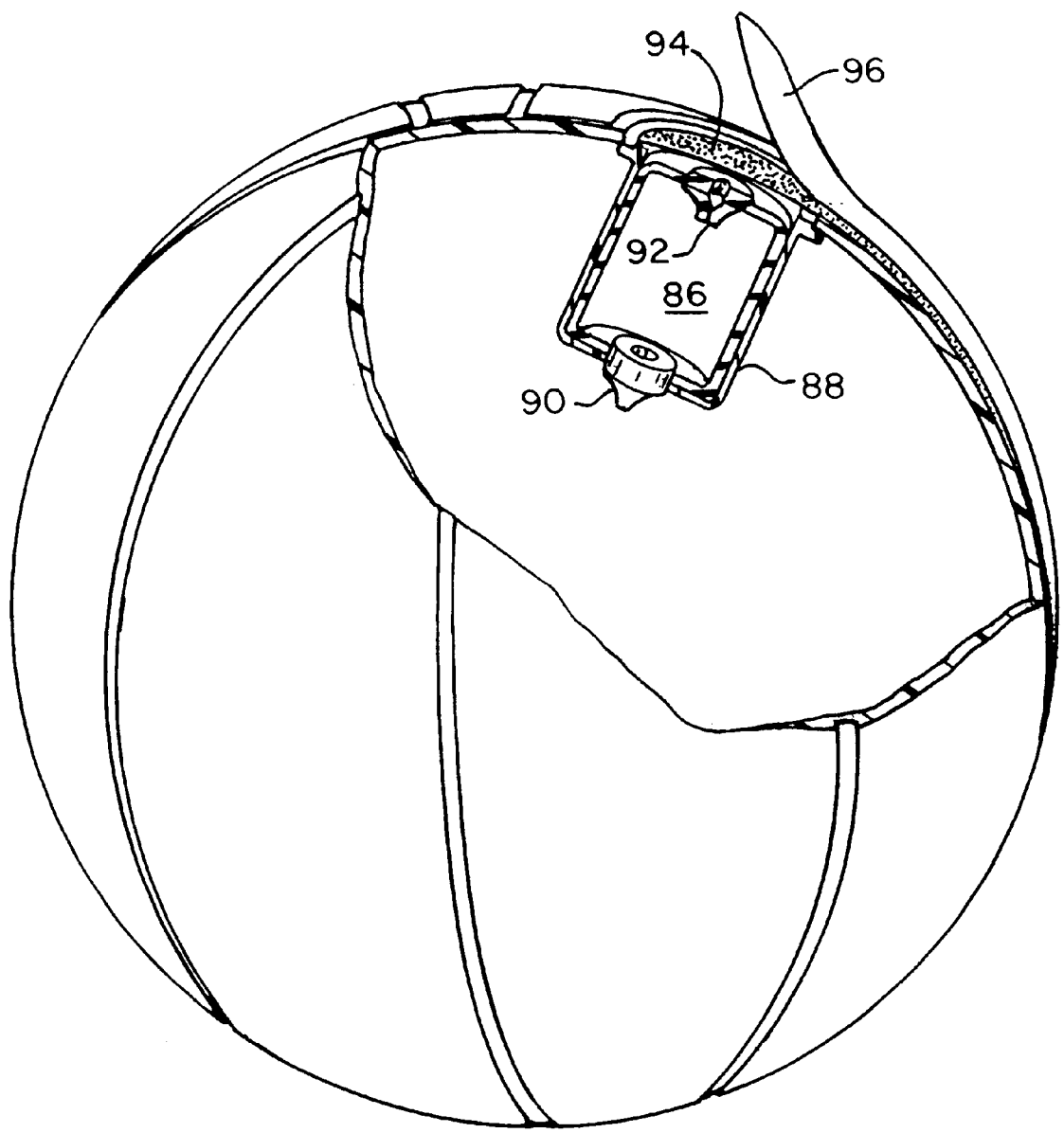
FIG. 8 illustrates another pump chamber embodiment of the invention.
Figure 9:
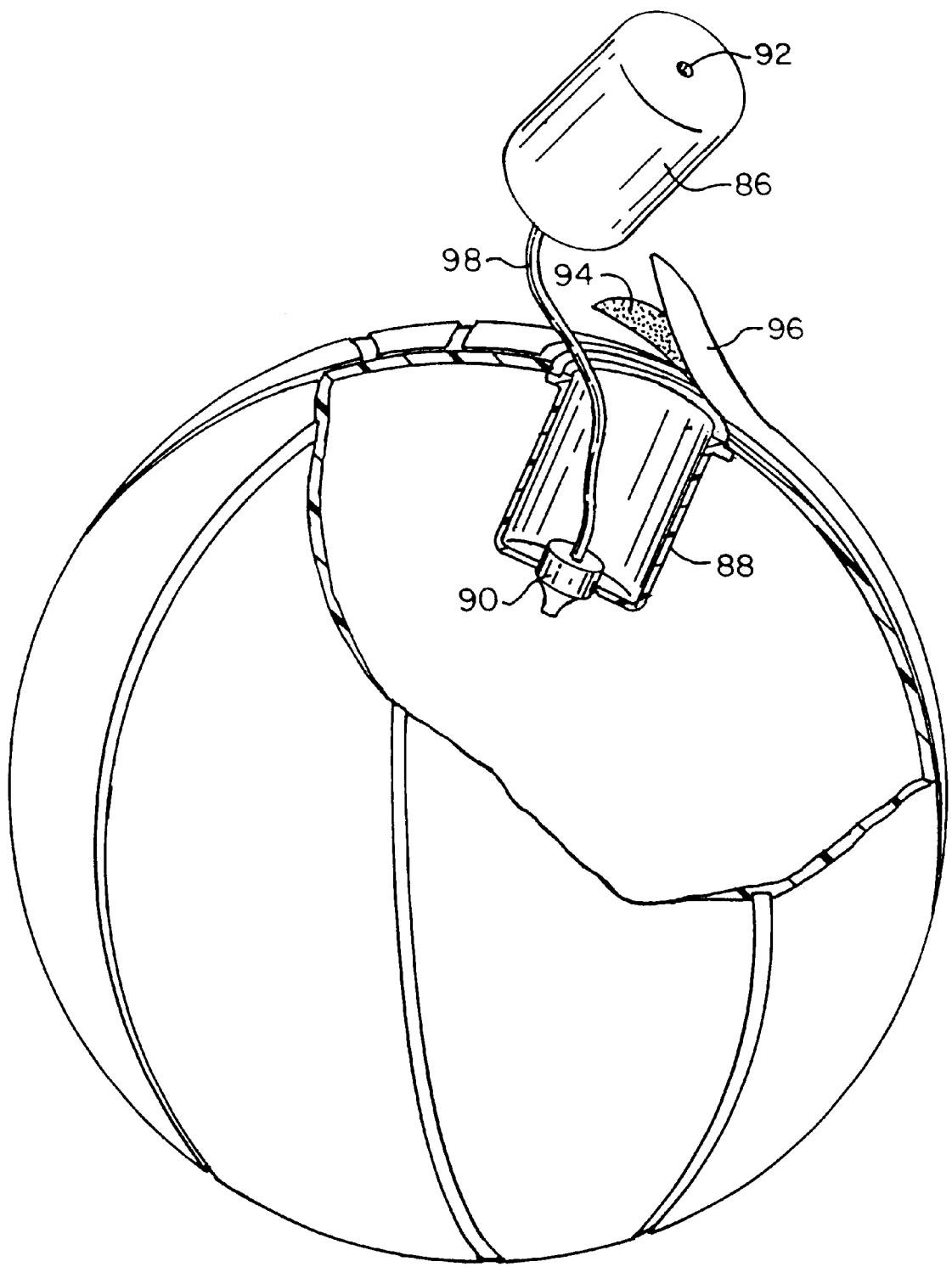
FIG. 9 illustrates a further pump chamber embodiment.

FIGS. 8 and 9 show other variations of the invention in which a squeezable bulb 86 is contained within a pocket 88 within the ball. In the FIG. 8 variation, the bulb 86 is permanently located in the pocket 88. The bulb 86 has an air outlet comprising a one-way valve 90 communicating through the pocket 88 into the interior of the ball. The bulb 86 also has an air inlet which also has a one-way valve 92 permitting air to enter the bulb 86. A permeable membrane 94 covers the bulb 86 and a flap 96 on the carcass permits access for pressing down on the bulb to squeeze air into the ball. The FIG. 9 variation is similar to that in FIG. 8 except that the bulb 86 is removed from the pocket 88 for easier manipulation. This is possible because the outlet of the bulb 86 is connected to the one-way valve 90 by means of the tube 98.

Figure 10:
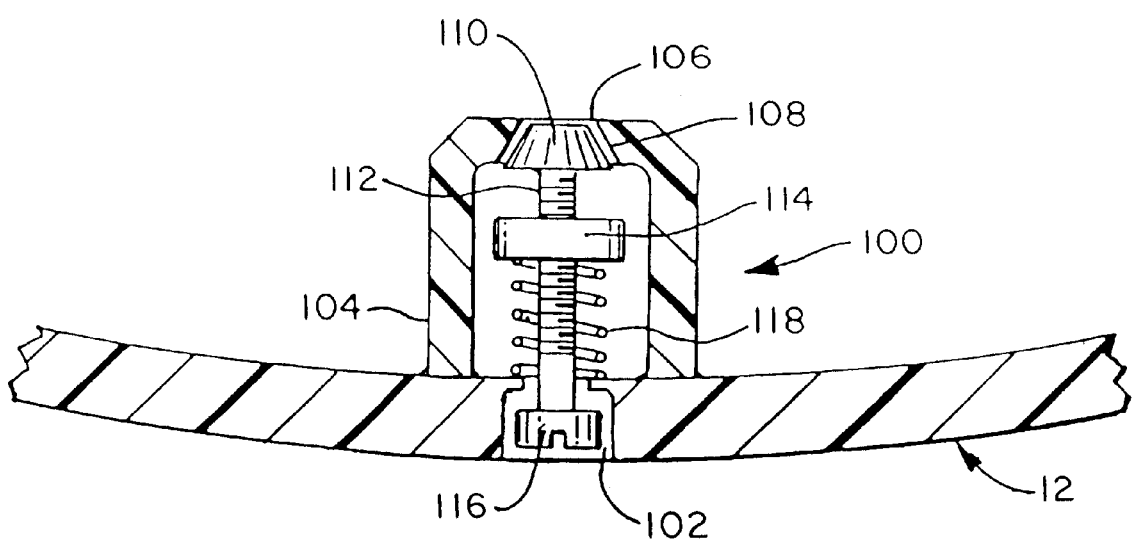
FIG. 10 is a sectional view of an adjustable, self regulating pressure relief valve.

Since the pressure in a sport ball can be too high through overinflation or a temperature increase, it is advisable to have a way to bleed pressure from the ball when the conventional inflating needle is not available. Such an arrangement is shown in FIG. 10 involving a self-regulating, adjustable pressure relief valve 100. This comprises an aperture 102 through the carcass 12 covered on the inside by the cupshaped enclosure 104. The enclosure 104 has an opening 106 with a valve seat 108. The valve 110 seals against the valve seat 108 to hold the pressure in the ball. The valve stem 112 is threaded through a disk 114 whereby the disk 114 can be moved axially on the valve stem 112 by turning the head 116 of the valve stem 112. A spring 118 is located around the valve stem 112 between the disk 114 and the carcass. Therefore, turning the head 116 and valve stem 112 moves the disk 114 axially on the valve stem and adjusts the pressure of the spring 118. The pressure of the spring 118 is adjusted such that an over pressure in the ball will force the valve to open and bleed pressure and then close when the desired pressure is reached.

What is claimed is:

1. An inflatable sport ball comprising a carcass having a section thereof comprising a manually operated inflation means comprising:
   a. an inside layer attached to said carcass;
   b. an outside layer hinged to said carcass along one edge thereof and moveable toward and away from said inside layer around said hinged edge;
   c. a bellows attached between said inside and said outside layers forming an inflation chamber;
   d. one-way valve means located in said outside layer for admitting air from the atmosphere into said inflation chamber when said outside layer is moved away from said inside layer; and
   e. one-way valve means in said inside layer for admitting air into said sport ball from said inflation chamber when said outside layer is moved towards said inside layer.

2. An inflatable sport ball as recited in claim 1 and further including means for locking said outside layer down against said inside layer.

3. An inflatable sport ball as recited in claim 1 wherein said carcass includes a layer which is non-stretchable whereby excess pressure in said sport ball will not significantly increase the size of said sport ball.

4. An inflatable sport ball as recited in claim 1 and further including means for bleeding air pressure from said ball.

5. An inflatable sport ball as recited in claim 1 wherein said sport ball is a basketball.

6. An inflatable sport ball as recited in claim 1 wherein said sport ball is a volley ball.

7. An inflatable sport ball as recited in claim 1 wherein said sport ball is a football.

8. An inflatable sport ball as recited in claim 1 wherein said sport ball is a soccer ball.

9. An inflatable sport ball as recited in claim 1 wherein said sport ball is a playground ball.

* * * * *